US012730539B2

(12) United States Patent
Mandziy et al.

(10) Patent No.: US 12,730,539 B2
(45) Date of Patent: Sep. 8, 2026

(54) ULTRASONIC SENSING DEVICE FOR TOUCH DETECTION

(71) Applicant: Cypress Semiconductor Corporation, San Jose, CA (US)

(72) Inventors: Vasyl Mandziy, Schyrets (UA); Andriy Maharyta, Lviv (UA); Oleksandr Karpin, Lviv (UA)

(73) Assignee: Cypress Semiconductor Corporation, San Jose, CA (US)

(*) Notice: Subject to any disclaimer, the term of this patent is extended or adjusted under 35 U.S.C. 154(b) by 0 days.

(21) Appl. No.: 18/899,020

(22) Filed: Sep. 27, 2024

(65) Prior Publication Data

US 2026/0093364 A1 Apr. 2, 2026

(51) Int. Cl.
*G06F 3/043* (2006.01)
*G06F 3/041* (2006.01)

(52) U.S. Cl.
CPC .......... *G06F 3/043* (2013.01); *G06F 3/04166* (2019.05)

(58) Field of Classification Search
None
See application file for complete search history.

(56) References Cited

U.S. PATENT DOCUMENTS 12,124,655 B2 * 10/2024 Stoicescu ................ G06F 3/044
2018/0341359 A1 * 11/2018 Khajeh ................. G06F 1/1605
2020/0160018 A1 * 5/2020 Panchawagh ........ H10N 30/857
2025/0190077 A1 * 6/2025 Batrinu ............... G06F 3/04186

* cited by examiner

*Primary Examiner* — Krishna P Neupane

(57) ABSTRACT

A system and method of ultrasonic sensing of events through a coupling substrate. The method includes receiving a first echo signal from a first interface of a touch substrate and a second ultrasound signal from a second interface of the touch substrate. The method includes generating a response signal based on the second ultrasound signal and a baseline signal. The method includes detecting an event associated with the substrate based on the response signal. The method includes providing a notification indicating the event.

18 Claims, 10 Drawing Sheets

ULTRASONIC SENSING DEVICE FOR TOUCH DETECTION

TECHNICAL FIELD

The present disclosure relates generally to the field of electronics, and more particularly, to an ultrasonic sensing device for touch detection.

BACKGROUND

Touch sensing through surfaces or liquids using ultrasound signal is currently being investigated as an alternative to capacitive touch sensing principles. Ultrasonic sensing relies on the transmission of an ultrasound signal and the reception and processing of the reflected signal from the touch surface of a touch substrate. The characteristics (e.g., amplitude, phase shift, etc.) of the signal will depend on the existence or non-existence of a touch event.

BRIEF DESCRIPTION OF THE DRAWINGS

The present disclosure is illustrated by way of example, and not by way of limitation, in the figures of the accompanying drawings in which like reference numerals refer to similar elements and in which.

DETAILED DESCRIPTION

Figure 1:
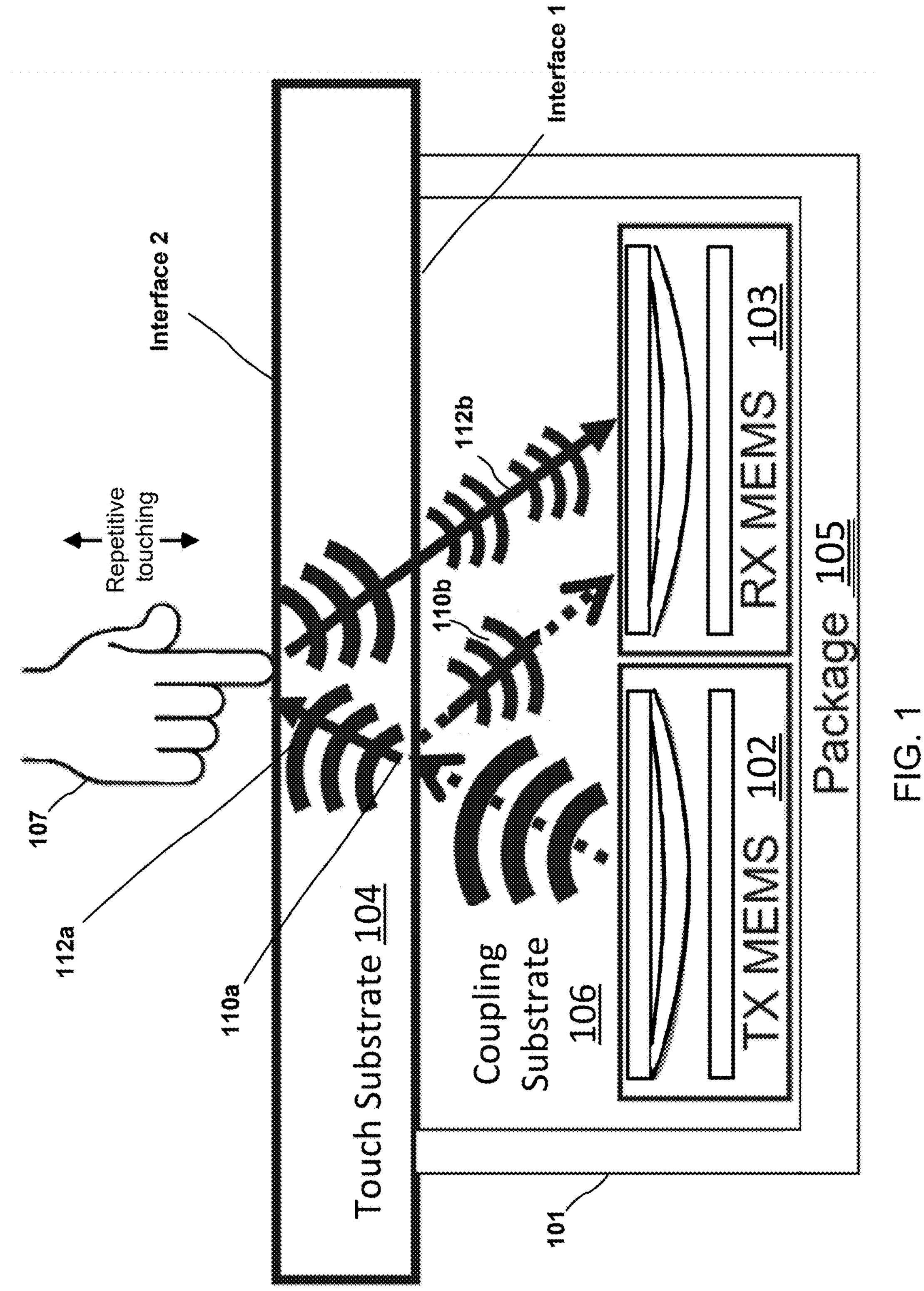
FIG. 1 illustrates a block diagram of an example environment for using an ultrasonic sensing device to detect a human hand touching a substrate, according to some embodiments.

The following description sets forth numerous specific details such as examples of specific systems, components, methods, and so forth, in order to provide a good understanding of various embodiments of the techniques described herein that are specifically designed to enhance an ultrasonic sensing device that is able to detect events through conventional touch substrates (e.g., glass) to further be able to detect similar events through non-conventional touch substrates that include at least one of metal, plastic, or wood. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the scope of the present disclosure.

For simplicity of description, many embodiments discussed herein describe an ultrasonic sensing device for detecting when a human finger touches a touch substrate. However, it is understood that any of these embodiments may be configured to detect when any type of substrate touches the touch substrate, as well as to detect/measure level, proximity, presence, gesture, and/or the like.

Ultrasonic sensors (e.g., capacitive micromachined ultrasonic transducers CMUT, ultrasonic microphone, etc.) have unique properties including, for example, a miniature size, high Electromagnetic Compatibility (EMC) or low radiation, ultrasound can propagate through metals and liquids, and the ability to measure time-of-flight. For these reasons, ultrasonic sensors have potential to solve many challenging problems. For example, ultrasonic sensors can detect touch-under-anything because they can detect a human finger touch through several different types of material. Ultrasonic sensors can also measure level and proximity, as well as detect presence or gesture. The versatility of ultrasonic sensors make them useful in a wide range of applications, such as in medical, automotive, household appliances, robotics, and mobile phones. Other technologies, such as capacitive and inductive, have limitations in these areas.

An ultrasonic sensor can detect whether a particular touch material (e.g., metal, glass, etc.) has been touched by another material (e.g., a human finger) based on detecting a change in amplitude of an echo signal (e.g., a continuous ultrasound signal). That is, the ultrasonic sensor uses its transmitter to generate and direct an echo signal toward the touch material, which causes some or all of the echo signal to reflect off of the touch material. The ultrasonic sensor uses its receiver to capture the reflected echo signal and then uses processing circuitry to determine whether the amplitude of the reflected signal is meaningfully different than the amplitude of the echo signal, where the change in amplitude is caused, to at least some extent, by a change in acoustic impedance at a touch interface of the touch material. If there is a no-touch event, then the echo signal is almost totally reflected, thereby producing a reflected echo signal at the receiver of the ultrasonic sensor that has an amplitude matching or nearly matching the amplitude of the transmitted echo signal. Alternatively, in a touch condition, the material (e.g., a human finger) touching the touch material absorbs part of the ultrasound energy; thereby producing a reflected echo signal at the receiver that has an amplitude that is less than the amplitude of the transmitted echo signal.

The conventional processing circuity includes filters, a rectifier, and an ADC. Specifically, the conventional ultrasonic sensor provides the reflected echo signal to a bandpass filter, whose filtered output is then provided to a rectifier, whose rectified output is then provided to a low-pass filter, and whose filtered output is then provided to an ADC. The ADC samples the filtered output of the low-pass filter at a particular sample rate to convert the filtered output (which corresponds to the reflected echo signal) to a digital signal and provides the digital signal to a post-processing device. The post-processing device uses the digital signal to detect whether a touch event has occurrence based on detecting a relatively small change in the amplitude of the echo signal.

However, the conventional ultrasonic sensor is not capable of detecting touch events through coupling materials that are constructed from plastic, wood, and/or metal because these materials shield signals that are indicative of changes in capacitance. Thus there is a long felt need to provide a system and method of detecting touch events through coupling materials constructed from plastic, wood, and/or metal.

Aspects of the disclosure address the above-noted and other deficiencies by enhancing an ultrasonic sensing device that is able to detect events through conventional touch substrates (e.g., glass) to further be able to detect similar events through non-conventional touch substrates that include at least one of metal, plastic, or wood.

In an illustrative embodiment, an ultrasonic sensing device is coupled to a touch substrate (e.g., metal, plastic, wood, glass, liquid) that is periodically being touched and untouched by one or more human fingers. The ultrasonic sensing device includes a transmitter/receiver (Tx/Rx) Micro Electro Mechanical Systems (MEMS), where the receiver also includes processing circuitry (e.g., filters, quadrature demodulator, ADC, and/or post-processors, etc.). In some embodiments, the processing circuitry may be included in one or more devices that are separate and downstream from the ultrasonic sensing device. The Tx/Rx MEMS acquires (e.g., receives) a first echo signal (e.g., ultrasonic signal) from a first interface of a touch substrate and a second ultrasound signal from a second interface of the touch substrate. The ultrasonic sensing device generates a response signal based on the second ultrasound signal and a baseline signal. The ultrasonic sensing device detects an event associated with the substrate based on the response signal. The ultrasonic sensing device provides a notification indicating the event.

FIG. 1 illustrates a block diagram of an example environment for using an ultrasonic sensing device to detect a human hand touching a substrate, according to some embodiments. The environment 100 includes an ultrasonic sensing device 101 coupled to a touch substrate 104 (e.g., a screen of a smart phone). The ultrasonic sensing device 101 includes a TX MEMS 102 and an RX MEMS 103 that are each coupled to a first interface (shown in FIG. 1 as Interface 1) of the touch substrate 104 via a coupling substrate 106.

The RX MEMS 103 includes processing circuitry (e.g., filters, quadrature demodulator, ADC, and/or post-processors, etc.) for processing the echo signals and reflected echo signals that are generated by the TX MEMS 102. In some embodiments, the processing circuitry may instead be included in one or more devices that are separate and downstream from the ultrasonic sensing device. One or more fingers of a human hand 107 are repeatedly touching the same and/or different regions of the touch substrate 104.

The first interface (e.g., Interface 1) is configured to be unaffected (e.g., not sensitive) by the presence of a touch event. The first interface generates a first signal and provides the first signal to the processing circuitry of the RX MEMS 103, where the first signal is unaffected by the presence or absence of a touch event.

The ultrasonic sensing device 101 is configured to detect whether the human hand 107 is currently touching a second interface (shown in FIG. 1 as Interface 2) of the touch substrate 104, where the second interface (e.g., Interface 2) is configured to be affected (e.g., sensitive to events) by the presence of a touch event.

For example, at a time when a finger of the human hand 107 is not touching the touch substrate 104, the TX MEMS 102 generates and transmits an echo signal 110*a* through the coupling substrate 106 (e.g., metal, plastic, wood, glass, liquid) and toward the touch substrate 104. The echo signal 110*a* impacts the first interface of the touch substrate 104, which causes all or nearly all of the echo signal 110*a* to reflect off of the first interface to produce a reflected echo signal 110*b* that is captured by the RX MEMS 103. The amplitude of the reflected echo signal 112*b* matches or nearly matches the amplitude of the echo signal 112*a*.

Alternatively, at a time when a finger of the human hand 107 is touching the touch substrate 104, the TX MEMS 102 generates and transmits an echo signal 112*a* through the coupling substrate 106 and toward the touch substrate 104. However, when the echo signal 112*a* impacts the first interface of the touch substrate 104, some of the ultrasound energy of the echo signal 112*a* is absorbed by the human finger touching the touch substrate; thereby causing the amplitude of the resultant reflected echo signal 112*b* to be less than the amplitude of the echo signal 112*a*.

It should be noted that the waves of the echo signals 110*a*, 110*b*, 112*a*, and 112*b* depicted in FIG. 1 are not shown to scale, and nor are they meant to show any particular difference in magnitude that may or may not exist between the echo signals.

Figure 2:
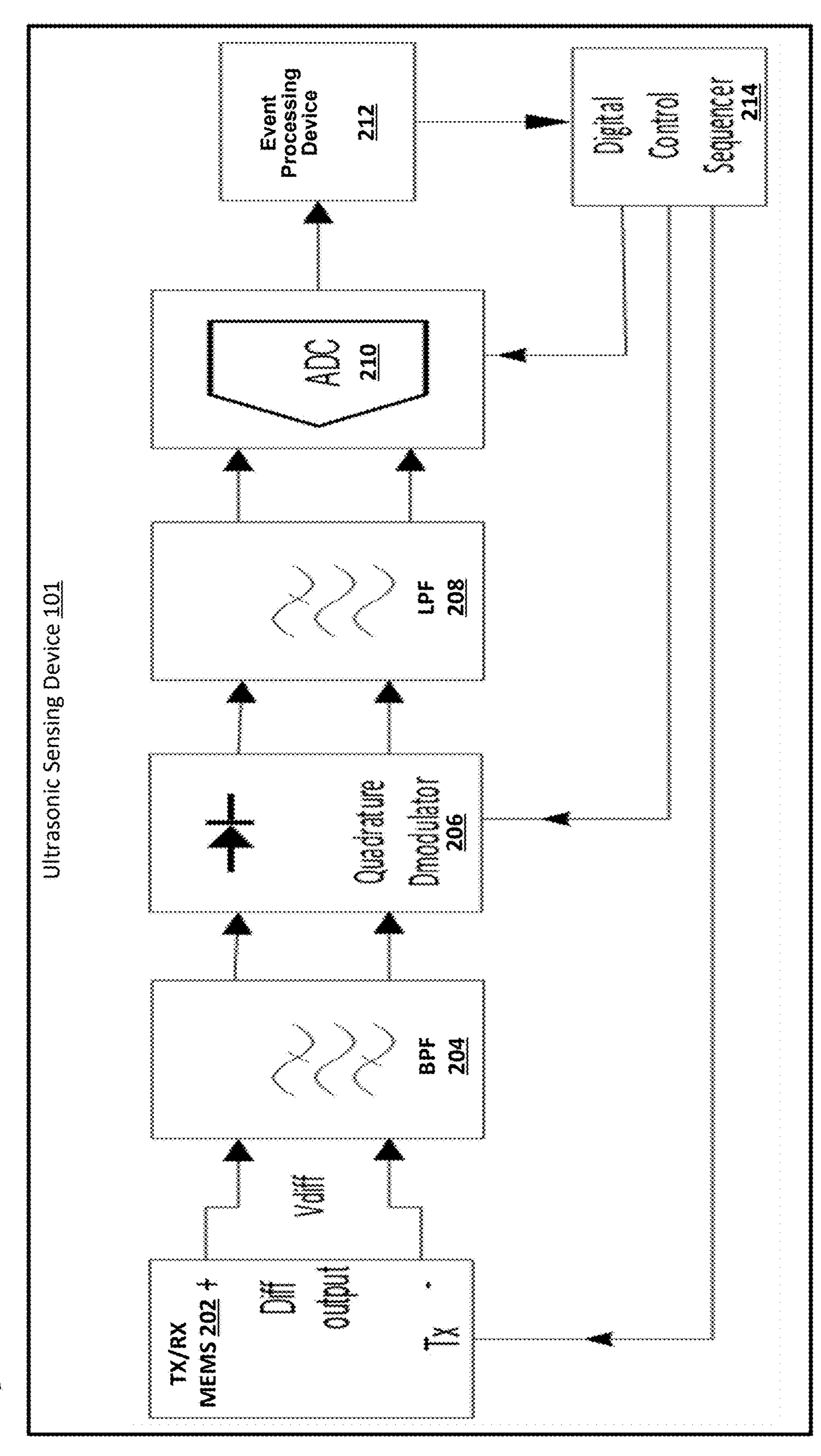
FIG. 2 illustrates a block diagram of an example ultrasonic sensing device that uses quadrature demodulation to detect a touch event associated with a substrate, according to some embodiments.

FIG. 2 illustrates a block diagram of an example ultrasonic sensing device 101 that uses quadrature demodulation to detect a touch event associated with a substrate, according to some embodiments. The ultrasonic sensing device 101 includes a TX/RX MEMS 202 (a combination of the TX MEMS 102 and the RX MEMs 103 in FIG. 1) a bandpass filter (BPF) 204, a quadrature demodulator 206, a low-pass filter (LPF) 208), and ADC 210, an event processing device 212, and a digital control sequencer 214.

The differential outputs of the TX/RX MEMS 202 are coupled to the inputs of the BPF 204, whose outputs are coupled to the inputs of the quadrature demodulator 206, whose outputs are coupled to the inputs of the LPF 208, whose outputs are coupled to the input of the ADC 210, whose output is coupled to the input of the event processing device 212, whose outputs is coupled to the input of the digital control sequencer 214. The output of the digital control sequencer 214 is fanned out to a third input of the ADC 210, a third input of the quadrature demodulator 206, and a Tx input of the TX/RX MEMS 202.

The TX/RX MEMS 202 includes a transmitter that is configured to generate and direct an echo signal toward the touch substrate 104. The TX/RX MEMS 202 includes a receiver that is configured to receive the reflected echo signal and provide the reflected echo signal to the BPF 204. The BPF 204 is configured to filter the reflected echo signal to generate a filtered signal and provide the filtered signal to the quadrature demodulator 206.

The quadrature demodulator 206 is configured to perform quadrature demodulation of the filtered signal (e.g., an ultrasound signal) to generate a differential in-phase (I)

signal and a differential quadrature (Q) signal according to the procedures disclosed in U.S. patent application Ser. No. 18/638,511, which is incorporated by reference in its entirety. The quadrature demodulator 206 is configured to provide the differential I signal and the differential Q signal to the LPF 208.

The LPF 208 is configured to filter the differential I signal to generate a filtered differential I signal and provide the filtered differential I signal to the ADC. The LPF 208 is configured to filter the differential Q signal to generate a filtered differential Q signal and provide the filtered differential Q signal to the ADC 210.

The ADC 210 is configured to generate, using an ADC sample rate, a first digital signal based on the differential I signal and a second digital signal based on the differential Q signal.

The event processing device 212 is configured to detect, based on the first digital signal and the second digital signal, an event associated with the touch substrate 104 by detecting an amplitude change in the reflected echo signal providing a notification indicating the event. The event processing device 212 generates an output signal ("event flag") indicating an event (e.g., touching event, proximity event, level event, gesture event, presence event, etc.) associated with the touch substrate 104 has occurred.

The event processing device 212 sends the event flag to the ADC 210, the quadrature demodulator 206, and the TX/RX MEMS 202 to support various modes of the ultrasonic sensing device 101, depending on the particular application. For example, the ultrasonic sensing device 101 may configure the TX/RX MEMS 202 as a proximity sensor to determine that a user is not near the touch substrate 104, and in response, configure the TX/RX MEMS 202 into a low-power state ("wake-on-touch mode") that forces the TX/RX MEMS 202 to use a lower scan/refresh rate (e.g., 1 hertz (Hz)) when checking for events. If the event processing device 212 determines that the user is now near the touch substrate 104, then the digital control sequencer 214 can send the event flag to the TX/RX MEMS 202 to force the TX/RX MEMS 202 to wake and return to the normal-power mode and then use the normal (e.g., 120 Hz) scan/refresh rate when checking for the same type of event or other types of events (e.g., gestures, touch, etc.).

The ultrasonic sensing device 101 can control the time windows in which the TX/RX MEMS 202 generates echo signals (e.g., "excitation" phases) and the time windows in which the processing circuitry waits to receive the echo signals (e.g., "listening" phases) by having the digital control sequencer 214 send timing signals to the Tx input of the TX/RX MEMS 202 to force the TX/RX MEMS 202 to generate echo signals. For example, the digital control sequencer 214 sends a first timing signal to the TX/RX MEMS 202 and then waits and listens for the TX/RX MEMS 202 to generate a first echo signal. The digital control sequencer 214 then sends a second timing signal the TX/RX MEMS 202 and then waits and listens for the TX/RX MEMS 202 to generate a second echo signal. Thus, the excitation phases and the listening phases are time separated.

Although FIG. 2 shows that the ultrasonic sensing device 101 includes the processing circuitry (e.g., LPF 208, ADC 210, event processing device 212, digital control sequencer 214) for processing the output of the quadrature demodulator 206, other embodiments may move one or more of the components of the processing circuitry into other devices that are separate and downstream from the ultrasonic sensing device 101. For example, the ADC 210, the event processing device 212, and the digital control sequencer 214 may each reside in a device that is separate from the ultrasonic sensing device 101.

Figures 3, 4:
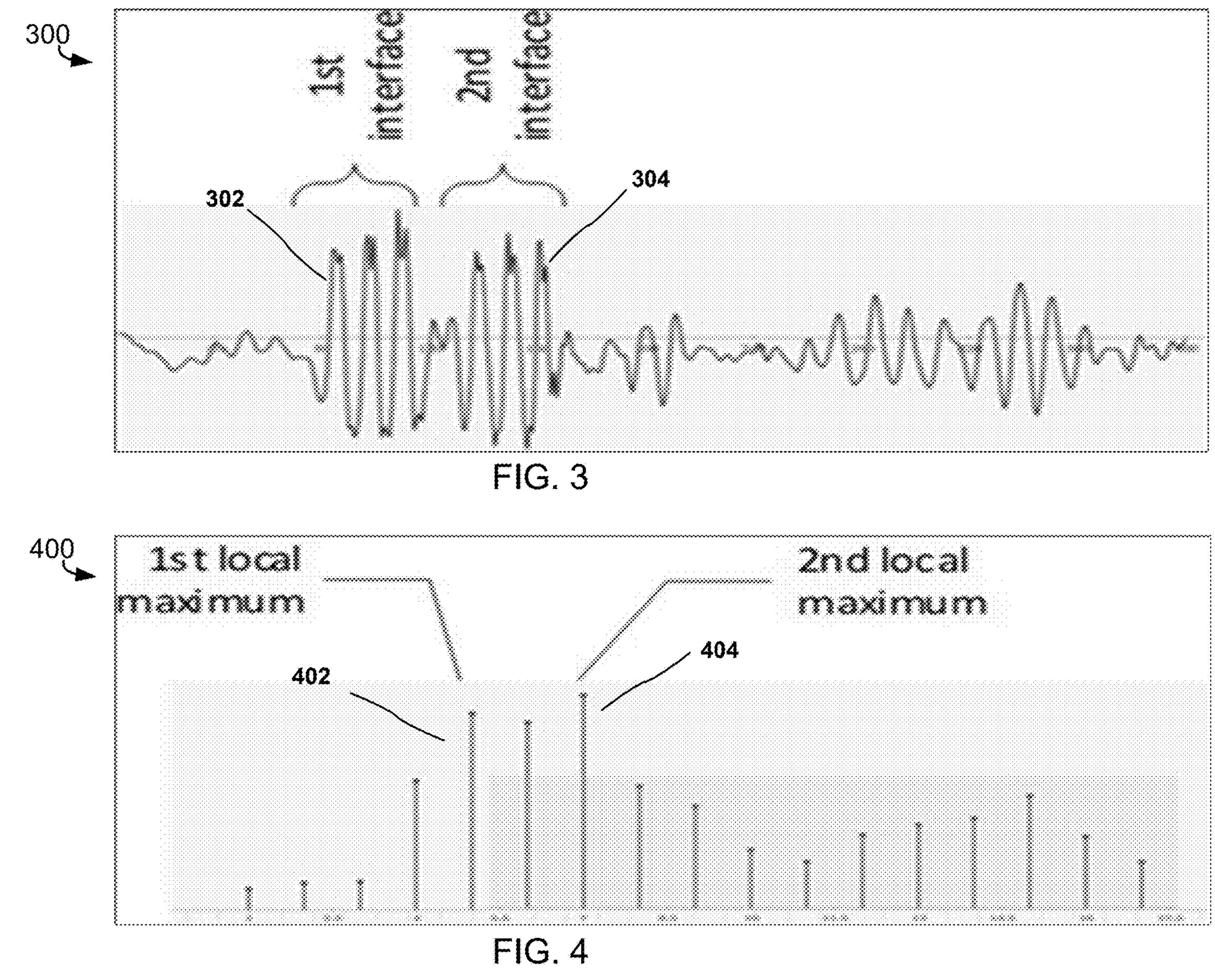
FIG. 3 is a graph illustrating echo signals detected by the TX/RX MEMS in FIG. 1, according to some embodiments.
FIG. 4 is a graph illustrating output samples that are produced by the ADC 210 based on echo signals, according to some embodiments.

FIG. 3 is a graph illustrating echo signals detected by the TX/RX MEMS in FIG. 1, according to some embodiments. Specifically, graph 300 shows an echo signal 302 that is reflected from Interface 1 (which is not sensitive to touch events) and directed toward RX MEMS 103 of the ultrasonic sensing device 101, and an echo signal 304 that is reflected from Interface 2 (which is sensitive to touch events) and directed toward RX MEMS 103 of the ultrasonic sensing device 101.

In some embodiments, the echo signal 302 refers to the output of LPF 208, which is produced by passing a first echo signal reflected from Interface 1 through BPF 204, quadrature demodulator 206, and LPF 208. Likewise, and in the same embodiment, the echo signal 304 refers to the output of LPF 208, which is produced by passing a second echo signal reflected from Interface 2 through BPF 204, quadrature demodulator 206, and LPF 208, FIG. 4 is a graph illustrating output samples that are produced by the ADC 210 based on echo signals, according to some embodiments. Specifically, graph 400 shows output samples 402 and output samples 404. The ADC 210 generates the output samples 402 by sampling the echo signal 302 at a sample rate and generates the output samples 404 by sampling the echo signal 304 at the sampling rate.

As discussed above, conventional ultrasonic sensors cannot detect touch events through coupling materials that are constructed from plastic, wood, and/or metal because the change in amplitude of an echo signal that is reflected from these materials responsive to a touch event is lower than the amplitude sensitivity of the conventional ultrasonic sensor. However, the ultrasonic sensing device 101 of the present disclosure is able to detect these subtle amplitude changes because it performs an automatic system calibration procedure that improves its amplitude detection sensitivity, which in turn, improves its touch event sensitivity.

Figure 5:
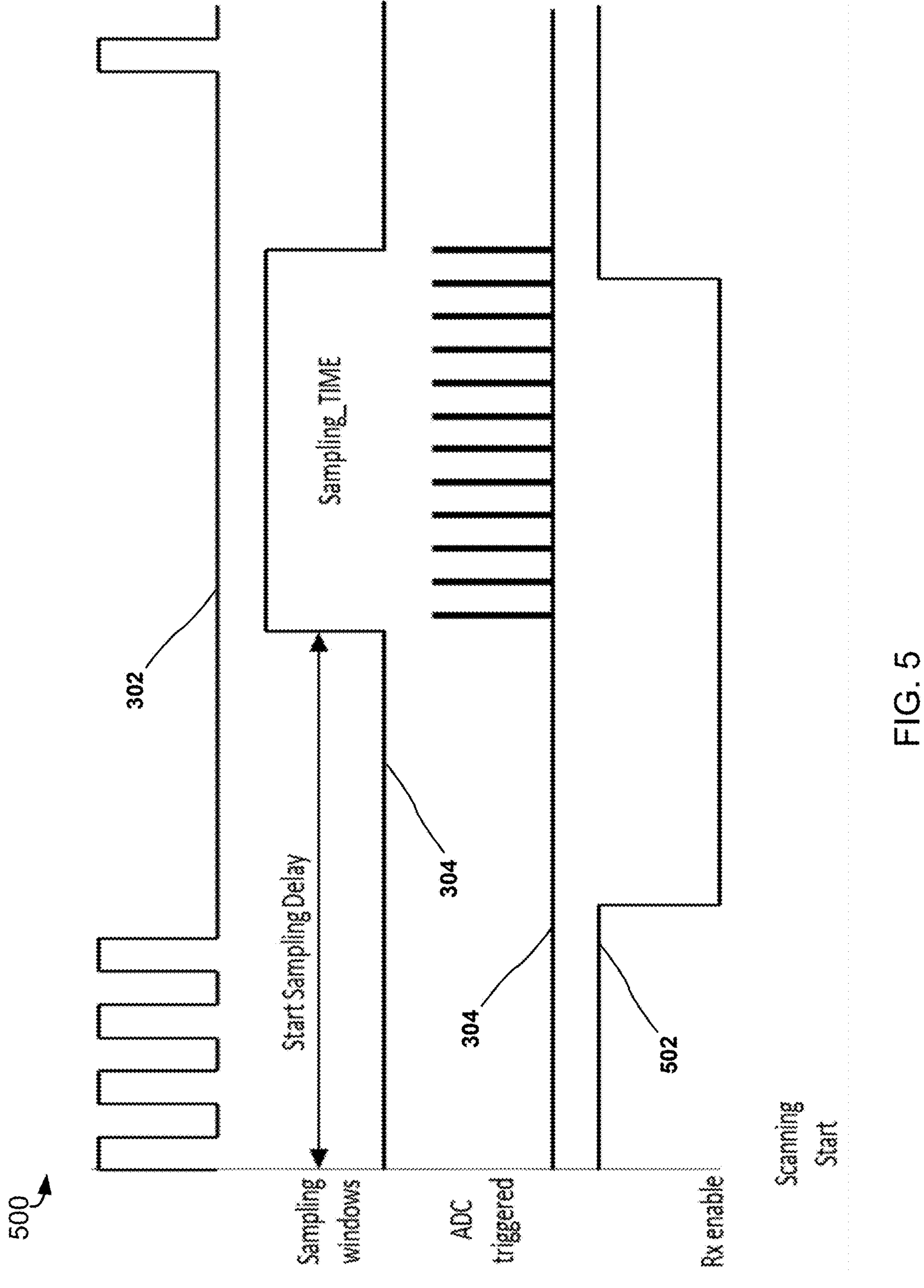
FIG. 5 is a graph illustrating a timing diagram for performing an automatic system calibration procedure to improve touch event sensitivity, according to some embodiments.

FIG. 5 is a graph illustrating a timing diagram for performing an automatic system calibration procedure to improve touch event sensitivity, according to some embodiments. With reference to graph 500, the ultrasonic sensing device 101 performs the ACS procedure as follows:

The ultrasonic sensing device 101 analyzes the echo signal 302 to identify a local maximum (e.g., maximum amplitude) of the echo signal 302. The ultrasonic sensing device 101 analyzes the echo signal 304 to identify a local maximum of the echo signal 304. In some embodiments, the local maximum of the echo signal 302 and the local maximum of the echo signal 304 may be affected by external factors including, for example, temperature, silicon processing attributes, and voltage variations. The ultrasonic sensing device 101 calculates an adjustment amount based on the local maximum of the echo signal 302 and/or the local maximum of the echo signal 304. The ultrasonic sensing device 101 then toggles a receiver (Rx) enable signal to adjust a starting time by the adjustment amount, where the starting time is when the ADC 210 begins to sample the echo signal 304 using its ADC 210 to generate a group of samples. In some embodiments, the ultrasonic sensing device 101 delays the starting time for the echo signal 304 until after the local maximum of the echo signal 302. In some embodiments, the ultrasonic sensing device 101 advances the starting time for the echo signal 304 so that it occurs before the local maximum of the echo signal 302.

Figures 6A, 6B:
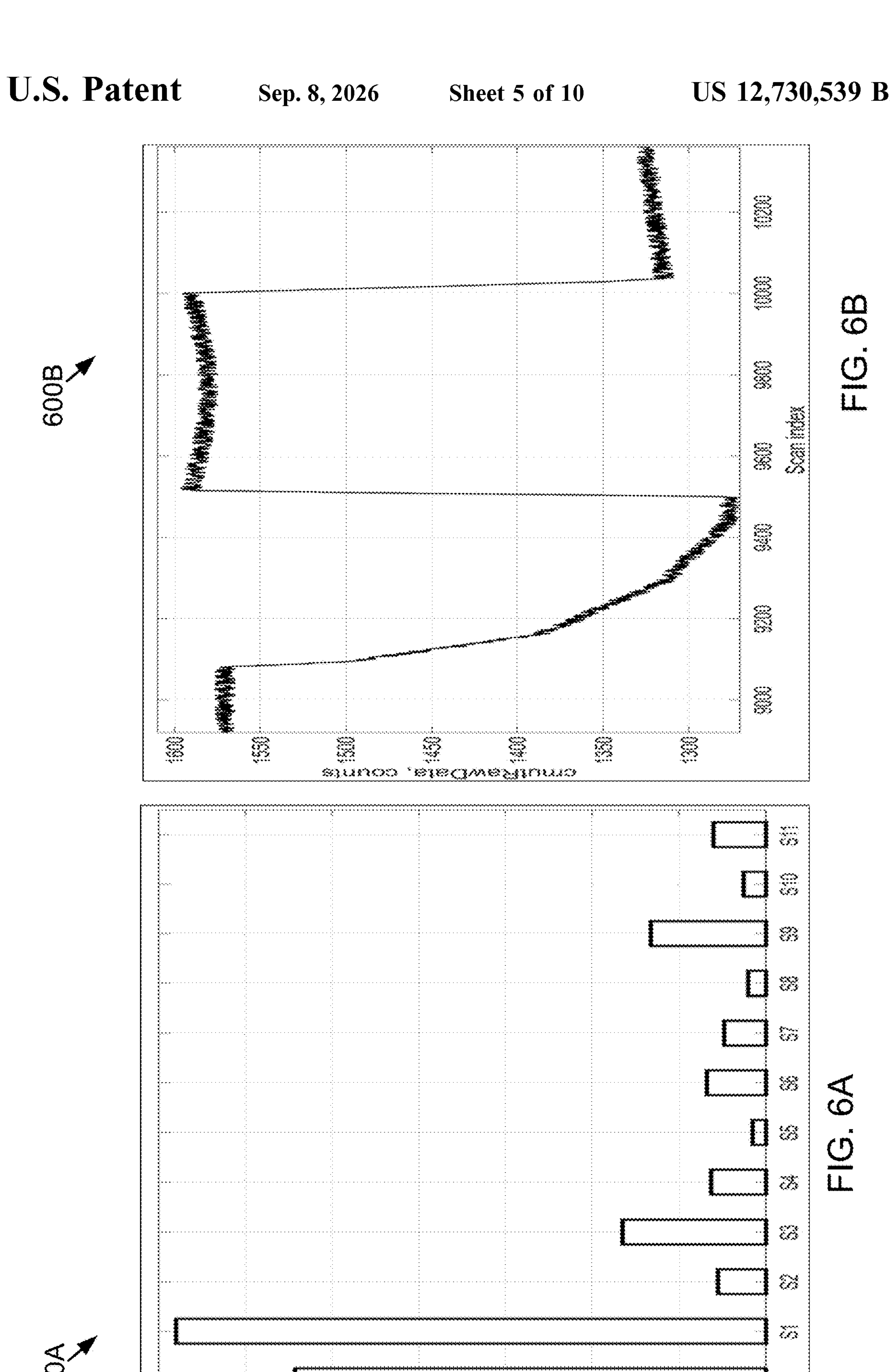
FIG. 6A is a graph illustrating a group of samples that the ultrasonic sensing device acquires by performing an ADC scan of the echo signals from its second interface that is sensitive to touch events, according to some embodiments.
FIG. 6B is a graph illustrating a cmutRawData signal indicating time periods of touch events and time periods of no-touch events, according to some embodiments.

FIG. 6A is a graph illustrating a group of samples that the ultrasonic sensing device acquires by performing an ADC scan of the echo signals from its second interface (e.g., Interface 2) that is sensitive to touch events, according to some embodiments. Specifically, graph 600A shows a group of 12 samples (e.g., $S_0$ to $S_{11}$) that are produced by ADC 210, where each sample is indicative of either a touch event or a no-touch event for a given point in time.

The ultrasonic sensing device 101 then calculates (e.g., generates) a RawData signal (e.g., a single signal) based on the group of 12 samples. In some embodiments, the ultrasonic sensing device 101 calculates a RawData signal referred to as a cmutRawData signal based on the following equation: cmutRawData=max($S_0$, $S_1$)+$S_3$. In other words, the ultrasonic sensing device 101 calculates a cmutRawData signal by adding the maximum amplitude between $S_0$ and $S_1$ to the amplitude of $S_3$.

In some embodiments, the ultrasonic sensing device 101 calculates a cmutRawData signal based on the following equation: cmutRawData=$S_0$+$S_1$. In other words, the ultrasonic sensing device 101 calculates a cmutRawData signal by adding the amplitude of $S_0$ to the amplitude of $S_1$.

In some embodiments, the ultrasonic sensing device 101 calculates a cmutRawData signal based on the following equation: cmutRawData=sum(abs($S_i$)). In other words, the ultrasonic sensing device 101 calculates a cmutRawData signal by adding the absolute value of the amplitudes of all the signals ($S_0$ to $S_{11}$).

FIG. 6B is a graph illustrating a cmutRawData signal indicating time periods of touch events and time periods of no-touch events, according to some embodiments. The ultrasonic sensing device 101 calculated the cmutRawData signal in graph 600B based on the following equation: cmutRawData=max($S_0$, $S_1$)+$S_3$.

Figure 7:
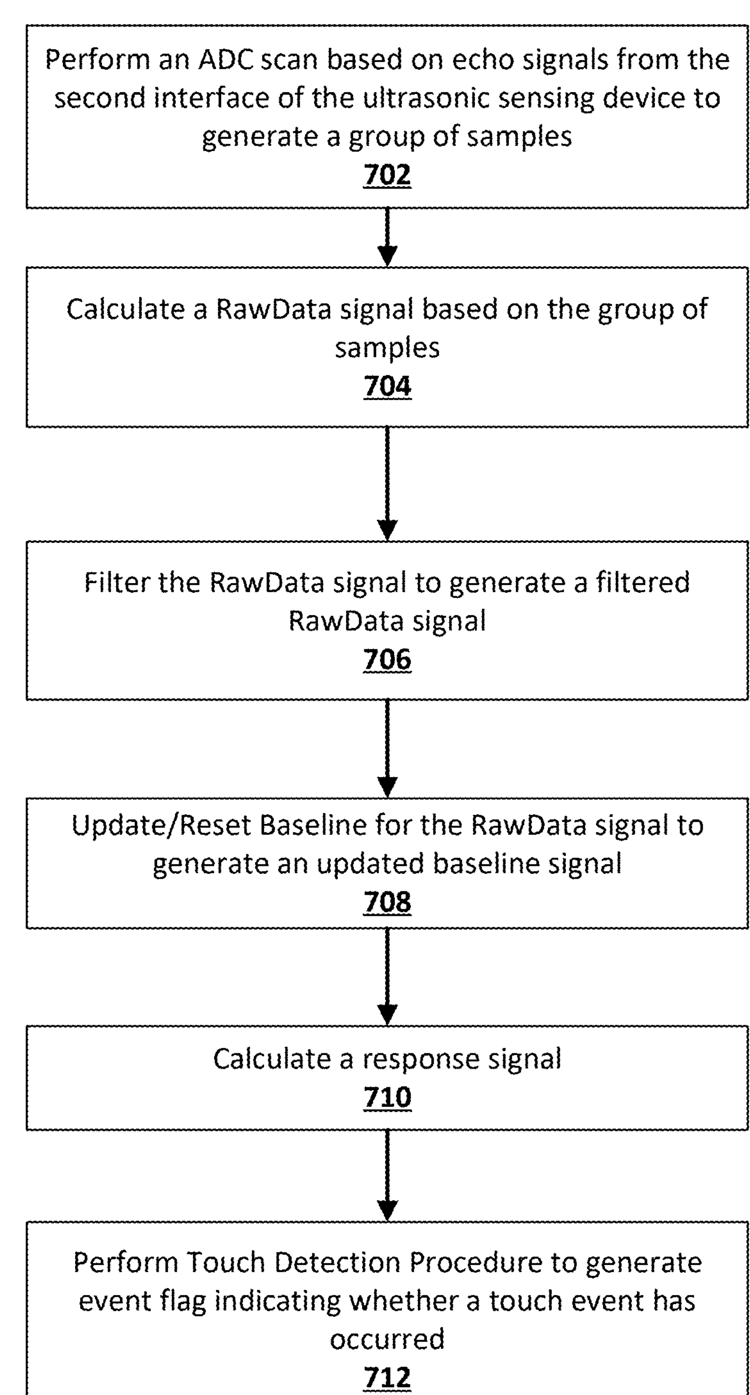
FIG. 7 is a flow diagram of a touch detection procedure for detecting touch events based on the single signal that is produced from sampled echo signals, according to some embodiments.

The ultrasonic sensing device 101 then analyzes the RawData signal according to a touch detection procedure (e.g., as shown in FIG. 7) to determine whether a touch event has occurred. For example, the ultrasonic sensing device 101 can determine that there is a no-touch event during a first time period, a touch event during a second time period after the first time period, a no-touch event during a third time period after the second time period, and a touch event during a fourth time period after the third time period.

FIG. 7 is a flow diagram of a touch detection procedure for detecting touch events based on the single signal that is produced from sampled echo signals, according to some embodiments. Although the operations are depicted in FIG. 7 as integral operations in a particular order for purposes of illustration, in other implementations, one or more operations, or portions thereof, are performed in a different order, or overlapping in time, in series or parallel, or are omitted, or one or more additional operations are added, or the method is changed in some combination of ways. In some embodiments, the procedure 700 may be performed by processing logic that includes hardware (e.g., circuitry, dedicated logic, programmable logic, microcode, etc.), firmware, or a combination thereof. In some embodiments, some or all operations of procedure 700 may be performed by one or more components (e.g., TX/RX MEMS 202, BPF 204, quadrature demodulator 206, LPF 208, ADC 210, event processing device 212, digital control sequencer 214) of the ultrasonic sensing device 101.

At operation 702, in some embodiments, the ADC 210 performs a scan (e.g., a sampling procedure) of an echo signal received from the second interface of the ultrasonic sensing device 101 to generate a group of samples (e.g., N-samples), where the second interface is sensitive to touch events. As previously discussed, FIG. 6A provides an example of a group of samples that can be acquired by the ultrasonic sensing device 101.

At operation 704, in some embodiments, the event processing device 212 calculates a RawData signal based on the group of N-samples (e.g. 12 samples).

As previously discussed, FIG. 6B provides an example of the RawData signal that can be calculated by the event processing device 212.

At operation 706, in some embodiments, the event processing device 212 filters the RawData signal according to a filtering procedure to generate filtered RawData signal. The filtering of the RawData signal improves the signal-to-noise ratio (SNR) of the RawData signal.

At operation 708, in some embodiments, the event processing device 212 updates/resets a baseline signal for the RawData signal according to a baseline signal updating/resetting procedure to generate an updated baseline signal that eliminates residual signals after tough removing, prevent stuck false-touch, and compensate signals from temperature drift.

At operation 710, in some embodiments, the event processing device 212 calculates a response signal according to a response signal calculation procedure.

At operation 712, in some embodiments, the event processing device 212 performs a touch detection procedure to generate an event flag that indicates whether a touch event has occurred.

Figure 8:
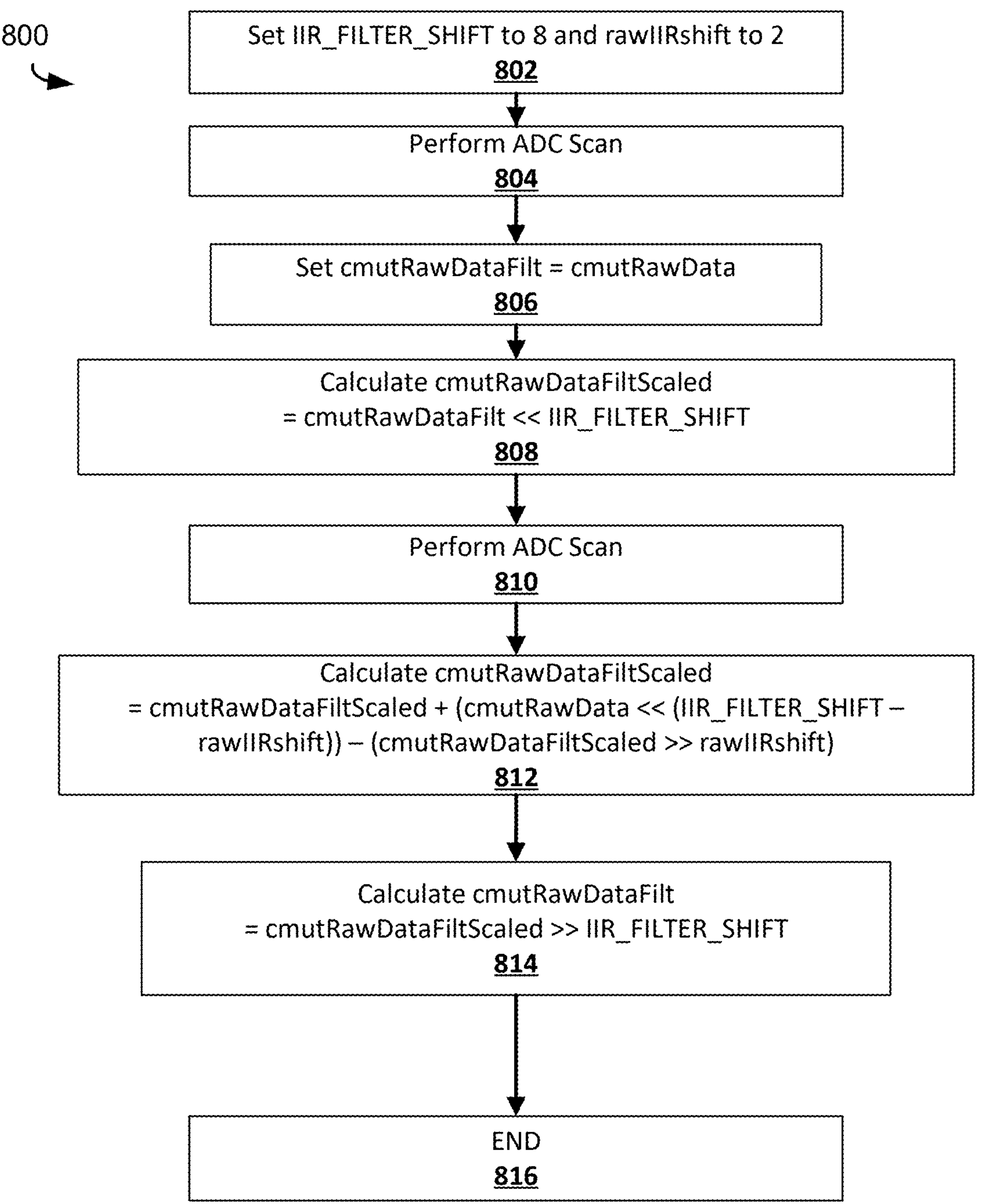
FIG. 8 is a flow diagram of a filtering procedure to improve the SNR of the RawData signal, according to some embodiments.

FIG. 8 is a flow diagram of a filtering procedure (as previously discussed in FIG. 7) to improve the SNR of the RawData signal, according to some embodiments. Although the operations are depicted in FIG. 8 as integral operations in a particular order for purposes of illustration, in other implementations, one or more operations, or portions thereof, are performed in a different order, or overlapping in time, in series or parallel, or are omitted, or one or more additional operations are added, or the method is changed in some combination of ways. In some embodiments, the procedure 800 may be performed by processing logic that includes hardware (e.g., circuitry, dedicated logic, programmable logic, microcode, etc.), firmware, or a combination thereof. In some embodiments, some or all operations of procedure 800 may be performed by one or more components (e.g., TX/RX MEMS 202, BPF 204, quadrature demodulator 206, LPF 208, ADC 210, event processing device 212, digital control sequencer 214) of the ultrasonic sensing device 101.

At operation 802, in some embodiments, the ultrasonic sensing device 101 sets IIR_FILTER_SHIFT to 8 and rawIIRshift to 2.

At operation 804, in some embodiments, the ADC 210 performs an ADC scan, using IIR_FILTER_SHIFT and rawIIRshift, of an echo signal received from the second interface of the ultrasonic sensing device 101 to generate a group of samples (e.g., N-samples), where the second interface is sensitive to touch events. In some embodiments, the ADC 210 performs an ADC scan at operation 804 that is similar to the ADC scan performed at operation 702 in procedure 700.

At operation 806, in some embodiments, the ultrasonic sensing device 101 sets cmutRawDataFilt equal to cmutRawData.

At operation 808, in some embodiments, the ultrasonic sensing device 101 calculates cmutRawDataFiltScaled based on the following equation: cmutRawDataFiltScaled=cmutRawDataFilt>>IIR_FILTER_SHIFT.

At operation 810, in some embodiments, the ADC 210 performs an ADC scan, using IIR_FILTER_SHIFT and rawIIRshift, of an echo signal received from the second interface of the ultrasonic sensing device 101 to generate a group of samples (e.g., N-samples), where the second interface is sensitive to touch events.

At operation 812, in some embodiments, the ultrasonic sensing device 101 calculates cmutRawDataFiltScaled based on the following equation: cmutRawDataFiltScaled=cmutRawDataFiltScaled+(cmutRawData<<(IIR_FILTER_SHIFT−rawIIRshift))−(cmutRawDataFiltScaled>>rawIIRshift).

At operation 814, in some embodiments, the ultrasonic sensing device 101 calculates cmutRawDataFilt based on the following equation: cmutRawDataFilt=cmutRawDataFiltScaled>>IIR_FILTER_SHIFT.

The procedure 800 ends at operation 816.

Figure 9:
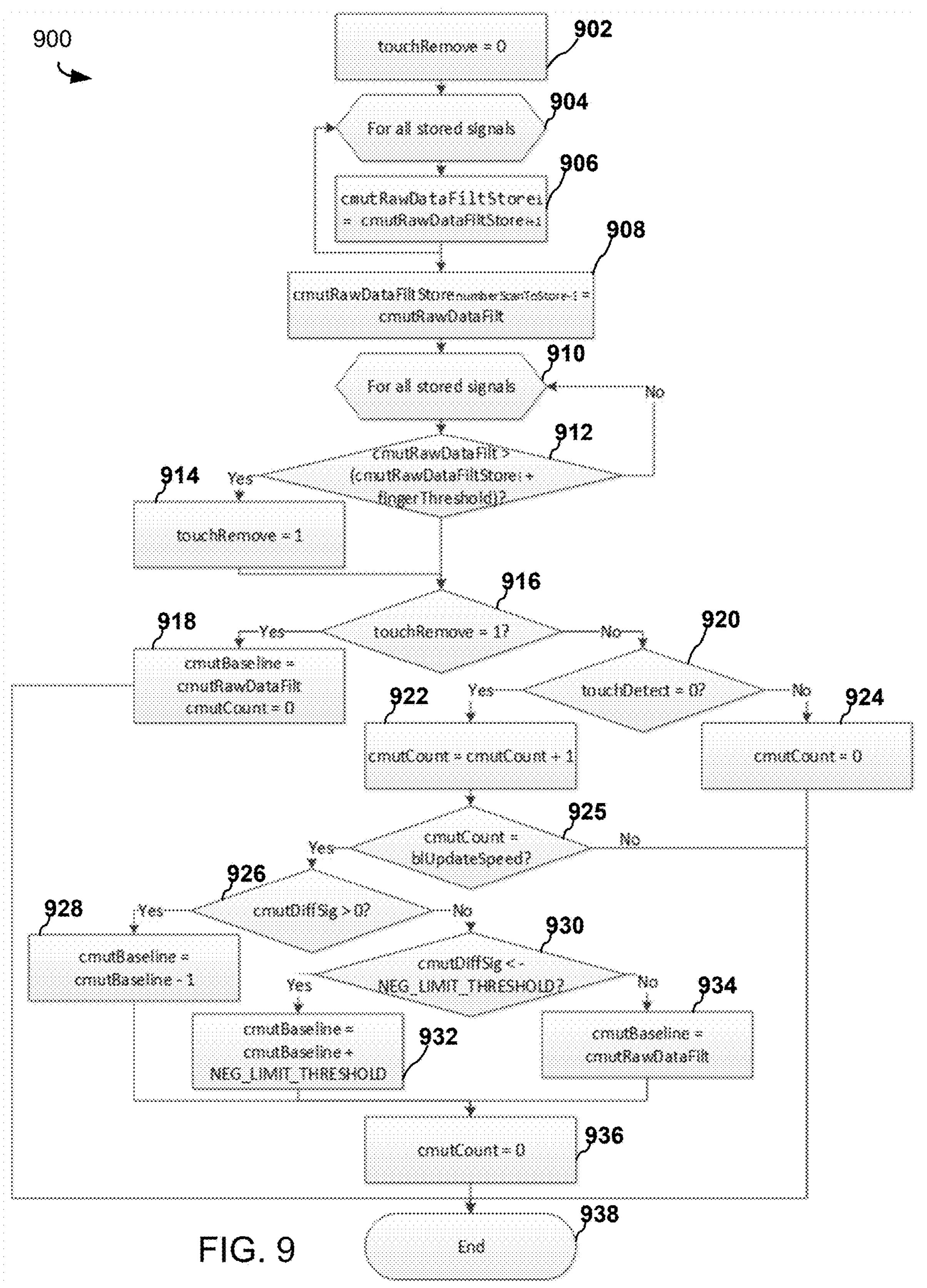
FIG. 9 is a flow diagram of a baseline signal updating/resetting procedure to generate an updated baseline signal, according to some embodiments.

FIG. 9 is a flow diagram of a baseline signal updating/resetting procedure (as previously discussed in FIG. 7) to generate an updated baseline signal, according to some embodiments. Although the operations are depicted in FIG. 9 as integral operations in a particular order for purposes of illustration, in other implementations, one or more operations, or portions thereof, are performed in a different order, or overlapping in time, in series or parallel, or are omitted, or one or more additional operations are added, or the method is changed in some combination of ways. In some embodiments, the procedure 900 may be performed by processing logic that includes hardware (e.g., circuitry, dedicated logic, programmable logic, microcode, etc.), firmware, or a combination thereof. In some embodiments, some or all operations of procedure 900 may be performed by one or more components (e.g., TX/RX MEMS 202, BPF 204, quadrature demodulator 206, LPF 208, ADC 210, event processing device 212, digital control sequencer 214) of the ultrasonic sensing device 101.

As discussed below, by implementing procedure 900, the ultrasonic sensing device 101 (1) resets the baseline signal if a finger release is detected, (2) updates the baseline signal by one count every blUpdateSpeed scans if a touch event is not detected in the previous scan, (3) and does not update/reset the baseline signal if a touch event is detected in the previous scan.

Specifically, at operation 902, in some embodiments, the ultrasonic sensing device 101 sets touchRemove to 0 to indicate that the touch event (e.g., one or more human fingers are still physically touching the coupling material) is not removed.

At operations 904 and 906, in some embodiments, the ultrasonic sensing device 101 loops through each of the previously stored signals (e.g., cmutRawDataFiltStore) and sets each cmutRawDataFiltStore (i) according to the following equation: cmutRawDataFiltStore (i)=cmutRawDataFiltStore (i+1).

In some embodiments, the ultrasonic sensing device 101 shifts the buffer of the previously stored signals to the left, and removes the oldest signal according to the following pseudo code:

EXAMPLE PSEUDO CODE

```
#define NUM_SCANS_TO_STORE1
(NUM_SCANS_TO_STORE-1u)
/* Move all data to the left.*/
for (i=0; i<NUM_SCANS_TO_STORE1; i++)
{
cmutRawDataFiltStore[i]=cmutRawDataFiltStore[i+1];
}
/* Write current filtered scanned data to the last element.*/
cmutRawDataFiltStore[NUM_SCANS_TO_
  STORE1]=cmutRawDataFilt;
```

At operation 908, in some embodiments, the ultrasonic sensing device 101 sets cmutRawDataFilStore (numberScanToStore−1)=cmutRawDataFilt, where cmutRawDataFilt refers to the current filtered RawData.

At operations 910 and 912, in some embodiments, the ultrasonic sensing device 101 loops through each of the stored signals (i) and determines whether cmutRawDataFilt>(cmutRawDataFiltStore (i)+fingerThreshold). In other words, the ultrasonic sensing device 101 compares the current filtered RawData to the previously stored raw data to determine if the current filtered RawData exceeds any of the previously stored RawData. If yes, then the ultrasonic sensing device 101 proceeds to operation 914 to set touchRemove=1 to indicate that the finger touch has been removed. The ultrasonic sensing device 101 proceeds to operation 916 after comparing the current filtered RawData against each of the previously stored RawData.

At operation 916, in some embodiments, the ultrasonic sensing device 101 determines whether the finger touch has been removed (e.g., touchRemove=1). If yes, then the ultrasonic sensing device 101 proceeds to operation 918 to set cmutCount=0 and reset the current baseline (e.g., cmutBaseline) according to the following equation: cmutBaseline=cmutRawDataFilt. If no, then the ultrasonic sensing device 101 proceeds to operation 920 to determine whether a touch event was not detected in the previous scan.

If a touch event was detected in the previous scan, then the ultrasonic sensing device 101 proceeds to operation 924 to reset cmutCount to 0. However, if a touch event was not detected in the previous scan, then the ultrasonic sensing device 101 proceeds to operation 922 to increase cmutCount according to the following equation: cmutCount=cmutCount+1.

At operation 925, in some embodiments, the ultrasonic sensing device 101 determines whether cmutCount=blUpdateSpeed (a value that represents the number of scans since last updating the baseline signal). If no, then procedure 900 ends. If yes, then the ultrasonic sensing device 101 proceeds to operation 926 to determine whether cmutDiffSig>0.

If yes, then the ultrasonic sensing device 101 proceeds to operation 928 to decrement cmutBaseline according to the following equation: cmutBaseline=cmutBaseline−1, and then proceeds to operation 936. If no, then the ultrasonic sensing device 101 proceeds to operation 930 to determine whether cmutDiffSig<NEG_LIMIT_THRESHOLD.

If less than, then the ultrasonic sensing device 101 proceeds to operation 932 to update cmutBaseline according to the following equation: cmutBaseline=cmutBaseline+NEG_LIMIT_THRESHOLD, and then proceeds to operation 936. Otherwise, if not less than, then the ultrasonic sensing device 101 proceeds to operation 934 to update cmutBaseline according to the following equation: cmutBaseline=cmutRawDataFilt, and then proceeds to operation 936.

At operation 936, in some embodiments, the ultrasonic sensing device 101 resets cmutCount to 0 and then proceeds to operation 938 to end procedure 900.

Figure 10:
FIG. 10 is a flow diagram of a response signal calculation procedure for defining a system reaction to user activity, according to some embodiments.
Figure 10:
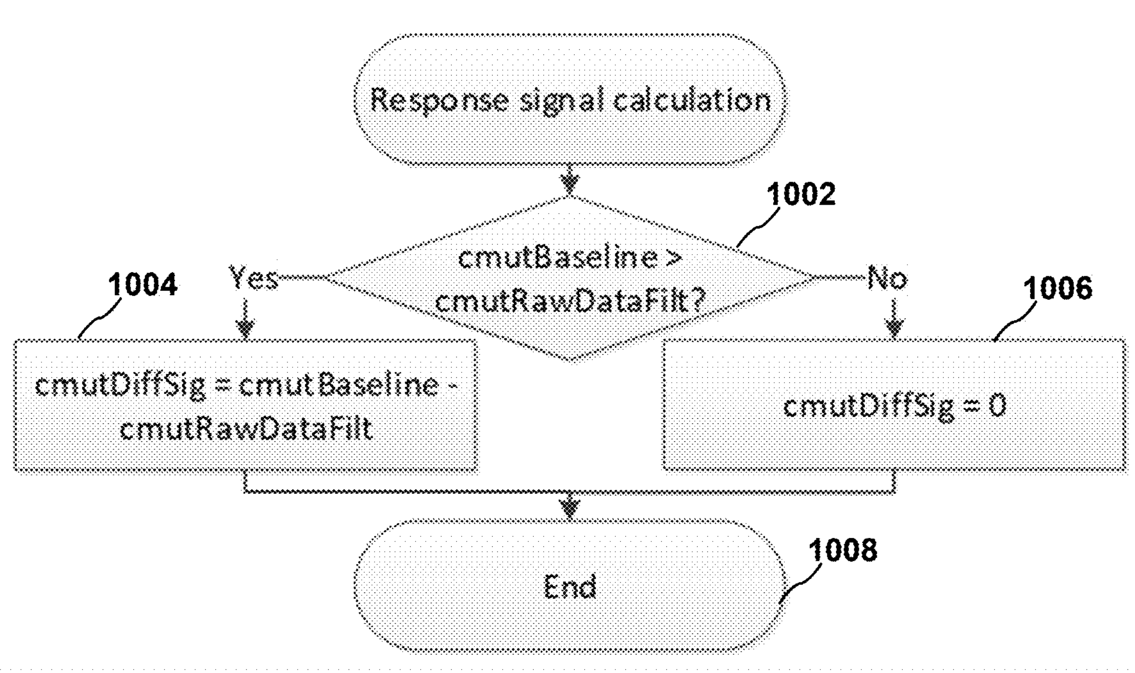

FIG. 10 is a flow diagram of a response signal calculation procedure (as previously discussed in FIG. 7) for defining a system reaction to user activity, according to some embodiments. Although the operations are depicted in FIG. 10 as integral operations in a particular order for purposes of illustration, in other implementations, one or more operations, or portions thereof, are performed in a different order, or overlapping in time, in series or parallel, or are omitted, or one or more additional operations are added, or the method is changed in some combination of ways. In some embodiments, the procedure 1000 may be performed by processing logic that includes hardware (e.g., circuitry, dedicated logic, programmable logic, microcode, etc.), firmware, or a combination thereof.

In some embodiments, some or all operations of procedure 1000 may be performed by one or more components (e.g., TX/RX MEMS 202, BPF 204, quadrature demodulator 206, LPF 208, ADC 210, event processing device 212, digital control sequencer 214) of the ultrasonic sensing device 101.

At operation 1002, in some embodiments, the ultrasonic sensing device 101 determines whether cmutBaseline is greater than cmutRawDataFilt. If yes, then the ultrasonic sensing device 101 proceeds to operation 1004 to calculate a response signal (e.g., cmutDiffSig) according to the following equation: cmutDiffSig=cmutBaseline−cmutRawDataFilt. If no, then the ultrasonic sensing device 101 proceeds to operation 1006 to reset the response signal (e.g., cmutDiffSig) to 0. The procedure 1000 ends (e.g., terminates) at operation 1008.

Figure 11:
FIG. 11 is a flow diagram of a touch detection procedure for detecting events using non-conventional/challenging coupling substrates, according to some embodiments.
Figure 11:
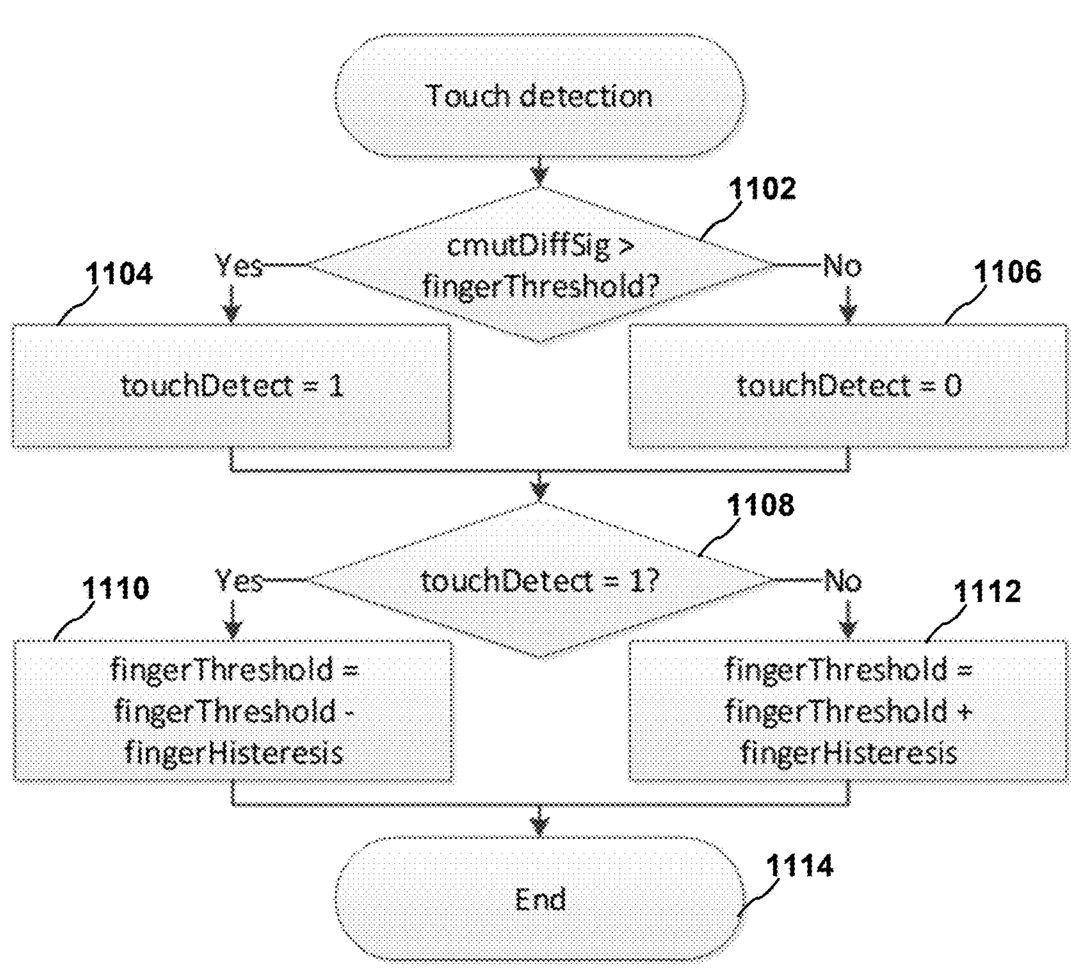

FIG. 11 is a flow diagram of a touch detection procedure (as previously discussed in FIG. 7) for detecting events using non-conventional/challenging coupling substrates (e.g., wood, plastic, metal), according to some embodiments.

Although the operations are depicted in FIG. 11 as integral operations in a particular order for purposes of illustration, in other implementations, one or more operations, or portions thereof, are performed in a different order, or overlapping in time, in series or parallel, or are omitted, or one or more additional operations are added, or the method is changed in some combination of ways. In some embodiments, the procedure 1100 may be performed by processing logic that includes hardware (e.g., circuitry, dedicated logic, programmable logic, microcode, etc.), firmware, or a combination thereof. In some embodiments, some or all operations of procedure 1100 may be performed by one or more components (e.g., TX/RX MEMS 202, BPF 204, quadrature demodulator 206, LPF 208, ADC 210, event processing device 212, digital control sequencer 214) of the ultrasonic sensing device 101.

At operation 1102, in some embodiments, the ultrasonic sensing device 101 determines whether the response signal (e.g., cmutDiffSig) is greater than a fingerThreshold. If yes, then the ultrasonic sensing device 101 proceeds to operation 1104 to set touchDetect=1 to indicate that a touch event is detected, and then proceeds to operation 1108. If no, then the ultrasonic sensing device 101 proceeds to operation 1106 to set touchDetect=0 to indicate that a touch event is not detected, and then proceeds to operation 1108.

At operation 1108, in some embodiments, the ultrasonic sensing device 101 determines whether a touch event is detected. If yes, then the ultrasonic sensing device 101 proceeds to operation 1110 to set fingerThreshold according to the following equation: fingerThreshold=fingerThreshold−fingerHisteresis, and then proceeds to operation 1114. In other words, if the ultrasonic sensing device 101 detects a touch event in the current scan, then the ultrasonic sensing device 101 decreases the fingerThreshold to prevent system noise from causing a failure (e.g., false negative) of the ultrasonic sensing device 101 to detect an occurrence of a touch event.

However, if no, then the ultrasonic sensing device 101 proceeds to operation 1112 to set fingerThreshold according to the following equation: fingerThreshold=fingerThreshold+fingerHisteresis, and then proceeds to operation 1114. In other words, if the ultrasonic sensing device 101 does not detect a touch event in the current scan, then the ultrasonic sensing device 101 increases the fingerThreshold to prevent system noise from causing the ultrasonic sensing device 101 from falsely reporting (e.g., false positive) a touch event. The procedure 1100 ends at operation 1014.

In the above description, some portions of the detailed description are presented in terms of algorithms and symbolic representations of operations on analog signals and/or digital signals or data bits within a non-transitory storage medium. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the disclosure. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as receiving, generating, detecting, providing, adjusting, calculating, sampling, acquiring, comparing, indicating, updating, resetting, or the like, refer to the actions and processes of an integrated circuit (IC) controller, or similar electronic device, that manipulates and transforms data represented as physical (e.g., electronic) quantities within the controller's registers and memories into other data similarly represented as physical quantities within the controller memories or registers or other such information non-transitory storage medium.

The words “example” or “exemplary” are used herein to mean serving as an example, instance, or illustration. Any aspect or design described herein as “example” or “exemplary” is not necessarily to be construed as preferred or advantageous over other aspects or designs. Rather, use of the words “example” or “exemplary” is intended to present concepts in a concrete fashion. As used in this application, the term “or” is intended to mean an inclusive “or” rather than an exclusive “or.” That is, unless specified otherwise, or clear from context, “X includes A or B” is intended to mean any of the natural inclusive permutations. That is, if X includes A; X includes B; or X includes both A and B, then “X includes A or B” is satisfied under any of the foregoing instances. In addition, the articles “a” and “an” as used in this application and the appended claims should generally be construed to mean “one or more” unless specified otherwise or clear from context to be directed to a singular form. Moreover, use of the term “an embodiment” or “one embodiment” or “an embodiment” or “one embodiment” throughout is not intended to mean the same embodiment or embodiment unless described as such.

Embodiments described herein may also relate to an apparatus (e.g., such as an AC-DC converter, and/or an ESD protection system/circuit) for performing the operations herein. This apparatus may be specially constructed for the required purposes, or it may include firmware or hardware logic selectively activated or reconfigured by the apparatus. Such firmware may be stored in a non-transitory computer-readable storage medium, such as, but not limited to, read-only memories (ROMs), random access memories (RAMs), EPROMs, EEPROMs, flash memory, or any type of media suitable for storing electronic instructions. The term “computer-readable storage medium” should be taken to include a single medium or multiple media that store one or more sets of instructions. The term “computer-readable medium” shall also be taken to include any medium that is capable of storing, encoding, or carrying a set of instructions for execution by the machine and that causes the machine to perform any one or more of the methodologies of the present embodiments. The term “computer-readable storage medium” shall accordingly be taken to include, but not be limited to, solid-state memories, optical media, magnetic media, any medium that is capable of storing a set of instructions for execution by the machine and that causes the machine to perform any one or more of the methodologies of the present embodiments.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

receiving a first ultrasound signal from a first interface of a substrate and a second ultrasound signal from a second interface of the substrate;

calculating a time interval based on at least one of a first amplitude of the first ultrasound signal or a second amplitude of the second ultrasound signal; and adjusting a starting time to sample the second ultrasound signal based on the time interval to increase an amplitude difference between the first ultrasound signal and the second ultrasound signal;

generating a response signal based on the second ultrasound signal and a baseline signal;

detecting an event associated with the substrate based on the response signal; and providing a notification indicating the event.

2. The method of claim 1, further comprising:

calculating a first maximum amplitude of the first ultrasound signal; and calculating a second maximum amplitude of the first ultrasound signal, wherein the first amplitude corresponds to the first maximum amplitude and the second amplitude corresponds to the second maximum amplitude.

3. The method of claim 1, further comprising:

sampling, at a sampling rate, the first ultrasound signal to generate a first group of samples;

sampling, at the sampling rate, the second ultrasound signal to generate a second group of samples; and calculating a raw data signal based on the second group of samples without regard to the first group of samples.

4. The method of claim 3, further comprising:

acquiring a group of previously stored samples associated with a plurality of ultrasound signals received from the second interface of the substrate;

comparing the second group of samples and the group of previously stored samples to determine whether at least one sample of the second group of samples exceeds the group of previously stored samples; and either:

indicating that the event no longer exists responsive to determining that at least one sample of the second group of samples exceeds the group of previously stored samples, or indicating that the event still exists responsive to determining that at least one sample of the second group of samples does not exceed the group of previously stored samples.

5. The method of claim 4, wherein indicating that the event no longer exists further comprises:

updating the baseline signal to generate an updated baseline that matches the raw data signal.

6. The method of claim 5, wherein generating the response signal comprises:

determining whether the updated baseline exceeds the second group of samples, and either:

generating the response signal by subtracting the second group of samples from the updated baseline responsive to determining that the updated baseline exceeds the second group of samples, or resetting the response signal responsive to determining that the updated baseline does not exceed the second group of samples.

7. The method of claim 6, wherein detecting the event associated with the substrate comprises:

comparing the response signal and a predetermined threshold value to determine whether the response signal exceeds the predetermined threshold value; and either:

indicating that the event is detected responsive to determining that the response signal exceeds the predetermined threshold value, or indicating that the event is not detected responsive to determining that the response signal does not exceed the predetermined threshold value.

8. The method of claim 7, wherein:

indicating that the event is detected further comprises decreasing the predetermined threshold value to prevent a false negative detection of a second event associated with a third ultrasound signal, or indicating that the event is not detected further comprises increasing the predetermined threshold value to prevent a false positive detection of the second event associated with the third ultrasound signal.

9. The method of claim 1, wherein the substrate comprises at least one of metal, wood, or plastic.

10. An integrated circuit, comprising:

an ultrasound sensing device configured to receive a first ultrasound signal from a first interface of a substrate and a second ultrasound signal from a second interface of the substrate; and a processing device coupled to the ultrasound sensing device, wherein the processing device is configured to:

calculate a time interval based on at least one of a first amplitude of the first ultrasound signal or a second amplitude of the second ultrasound signal; and adjust a starting time to sample the second ultrasound signal based on the time interval to increase an amplitude difference between the first ultrasound signal and the second ultrasound signal;

generate a response signal based on the second ultrasound signal and a baseline signal;

detect an event associated with the substrate based on the response signal; and provide a notification indicating the event.

11. The integrated circuit of claim 10, the processing device is further configured to:

calculate a first maximum amplitude of the first ultrasound signal; and calculate a second maximum amplitude of the first ultrasound signal, wherein the first amplitude corresponds to the first maximum amplitude and the second amplitude corresponds to the second maximum amplitude.

12. The integrated circuit of claim 10, the processing device is further configured to:

sample, at a sampling rate, the first ultrasound signal to generate a first group of samples;

sample, at the sampling rate, the second ultrasound signal to generate a second group of samples; and calculate a raw data signal based on the second group of samples without regard to the first group of samples.

13. The integrated circuit of claim 12, the processing device is further configured to:

acquire a group of previously stored samples associated with a plurality of ultrasound signals received from the second interface of the substrate;

compare the second group of samples and the group of previously stored samples to determine whether at least one sample of the second group of samples exceeds the group of previously stored samples; and either:

indicate that the event no longer exists responsive to determining that at least one sample of the second group of samples exceeds the group of previously stored samples, or indicate that the event still exists responsive to determining that at least one sample of the second group of samples does not exceed the group of previously stored samples.

14. The integrated circuit of claim 13, wherein to indicate that the event no longer exists, the processing device is further to:

update the baseline signal to generate an updated baseline that matches the raw data signal.

15. The integrated circuit of claim 14, wherein to generate the response signal, the processing device is further to:

determine whether the updated baseline exceeds the second group of samples, and either:

generate the response signal by subtracting the second group of samples from the updated baseline responsive to determining that the updated baseline exceeds the second group of samples, or reset the response signal responsive to determining that the updated baseline does not exceed the second group of samples.

16. The integrated circuit of claim 15, wherein to detect the event associated with the substrate, the processing device is further to:

compare the response signal and a predetermined threshold value to determine whether the response signal exceeds the predetermined threshold value; and either:

indicate that the event is detected responsive to determining that the response signal exceeds the predetermined threshold value, or indicate that the event is not detected responsive to determining that the response signal does not exceed the predetermined threshold value.

17. The integrated circuit of claim 16, wherein:

the processing device indicates that the event is detected by further decreasing the predetermined threshold value to prevent a false negative detection of a second event associated with a third ultrasound signal, or the processing device indicates that the event is not detected by further increasing the predetermined threshold value to prevent a false positive detection of the second event associated with the third ultrasound signal.

18. A method comprising:

receiving a first ultrasound signal from a first interface of a substrate and a second ultrasound signal from a second interface of the substrate, wherein the substrate comprises at least one of metal, wood, or plastic;

calculating a time interval based on at least one of a first amplitude of the first ultrasound signal or a second amplitude of the second ultrasound signal; and adjusting a starting time to sample the second ultrasound signal based on the time interval to increase an amplitude difference between the first ultrasound signal and the second ultrasound signal;

generating a response signal based on the second ultrasound signal and a baseline signal; and detecting an event associated with the substrate based on the response signal.

* * * * *